United States Patent
Denton et al.

(10) Patent No.: US 7,498,585 B2
(45) Date of Patent: Mar. 3, 2009

(54) METHOD AND APPARATUS FOR SIMULTANEOUS DETECTION AND MEASUREMENT OF CHARGED PARTICLES AT ONE OR MORE LEVELS OF PARTICLE FLUX FOR ANALYSIS OF SAME

(75) Inventors: M. Bonner Denton, Tucson, AZ (US); Roger Sperline, Tucson, AZ (US); David W. Koppenaal, Richland, WA (US); Charles J. Barinaga, Richland, WA (US); Gary Hieftje, Bloomington, IN (US); James H. Barnes, IV, Santa Fe, NM (US); Eugene Atlas, Irvine, CA (US)

(73) Assignee: Battelle Memorial Institute, Richland, WA (US)

( * ) Notice: Subject to any disclaimer, the term of this patent is extended or adjusted under 35 U.S.C. 154(b) by 483 days.

(21) Appl. No.: 11/399,966

(22) Filed: Apr. 6, 2006

(65) Prior Publication Data

US 2008/0073548 A1 Mar. 27, 2008

(51) Int. Cl.
*H01J 37/244* (2006.01)
(52) U.S. Cl. .................. 250/397; 250/283; 250/281; 250/299; 250/300; 250/370.01; 330/250; 330/308
(58) Field of Classification Search .......... 250/397, 250/283, 281, 299, 300, 370.01, 370.08, 250/370.09; 330/250, 308
See application file for complete search history.

(56) References Cited

U.S. PATENT DOCUMENTS

| | | | |
|---|---|---|---|
| 4,654,531 A | 3/1987 | Morris et al. | |
| 5,113,077 A * | 5/1992 | Shimizu et al. | 250/370.11 |
| 5,220,167 A | 6/1993 | Brown et al. | |
| 5,471,059 A | 11/1995 | Freedman et al. | |
| 5,619,040 A * | 4/1997 | Shapiro et al. | 250/370.09 |
| 5,801,380 A | 9/1998 | Sinha | |
| 5,962,856 A * | 10/1999 | Zhao et al. | 250/370.09 |
| 6,046,451 A | 4/2000 | Sinha | |
| 6,163,029 A * | 12/2000 | Yamada et al. | 250/370.09 |
| 6,180,942 B1 | 1/2001 | Tracy et al. | |
| 6,296,501 B1 | 10/2001 | Ray et al. | |
| 6,480,278 B1 * | 11/2002 | Fuerstenau et al. | 356/394 |

(Continued)

FOREIGN PATENT DOCUMENTS

DE 102004031371 A1 1/2006

(Continued)

OTHER PUBLICATIONS

Barnes, J.H. et al., Characterization of a Focal Plane Cameral Fitted to a Mattauch-Herzog Geometry Mass Spectrograph. Anal. Che., 2004, vol. 76, pp. 2531-2536.

(Continued)

*Primary Examiner*—Jack I Berman
*Assistant Examiner*—Michael J Logie
(74) *Attorney, Agent, or Firm*—James D. Matheson

(57) ABSTRACT

A charged particle detector and method are disclosed providing for simultaneous detection and measurement of charged particles at one or more levels of particle flux in a measurement cycle. The detector provides multiple and independently selectable levels of integration and/or gain in a fully addressable readout manner.

29 Claims, 8 Drawing Sheets

U.S. PATENT DOCUMENTS

| | | | |
|---|---|---|---|
| 6,576,899 B2* | 6/2003 | Sinha et al. | 250/299 |
| 6,690,019 B2* | 2/2004 | Stettner et al. | 250/370.08 |
| 6,756,587 B1 | 6/2004 | Bateman et al. | |
| 7,403,065 B1* | 7/2008 | Gresham et al. | 330/9 |
| 7,425,714 B2* | 9/2008 | Sakakibara et al. | 250/492.22 |
| 2004/0056204 A1* | 3/2004 | Tanaka et al. | 250/370.09 |
| 2005/0190286 A1 | 9/2005 | Kaduchak et al. | |
| 2005/0274888 A1* | 12/2005 | Darling et al. | 250/305 |

FOREIGN PATENT DOCUMENTS

| | | |
|---|---|---|
| WO | WO 97/15944 | 5/1997 |
| WO | WO 97/28888 | 8/1997 |
| WO | WO/97/39474 | 10/1997 |
| WO | WO 97/39474 | 10/1997 |
| WO | WO 99/31707 | 6/1999 |
| WO | WO/00/20851 | 4/2000 |

OTHER PUBLICATIONS

Barnes, J.H. et al., Characterization of a Focal Plane Cameral Fitted to a Mattauch-Herzog Geometry Mass Spectograph. Anal. Chem., 2002, 74, pp. 53271-5332.
Knight, A.K., et al., The development of a micro-Faraday array for ion detection. International Journal of Mass Spectrometry, 2002, v. 215, pp. 131-139.
Barnes, J.H., et al, Journal Am. Soc. Mass Spec, 2004, v. 15 pp. 769-776.
Barnes, J.H., Anal. Bioanal. Chem., 2004, v. 380, pp. 227-234.
Burgoyne, T.W., Journal of the American Society for Mass Spectrometry, 1997, vol. 8, pp. 207-318.
Solyom, D.A., et al, Spectrochimica Acta, Part B: Atomic Spectroscopy, 2001, vol. 56B, pp. 1717-1729.
PCT Written Opinion/International Search Report.
Koppenaal, et al, Anal. Chem., 77, (21): 2005, pp. 419A-427A.
Birkinshaw, K, et al, Int. J. Mass Spectrom, 2002, 215, (1-3), pp. VII-VIII.
Beynon, J.H, et al, Anal. Chem, 1975, 47, pp. 1734-1738.
Sinha, M.P., Anal. Chem., 1991, 63, (18), pp. 2012-2016.
Birkinshaw, K, et al, Int. J. Mas Spectrom, 1997, 32, pp. 795-806.
Birkinshaw, K, et al, Rapid Commun. Mass Spectrom, 1996, 10, pp. 1675-1677.
Barnes, J.H. et al., Int. J. Mass Spectrom., 2004, 238, pp. 33-46.
Solyom, D.A., et al., Spectrochim, Acta, Part B, 2001, 56, 1717-1729.
Cody, R.B., et al., J. Am. Soc. Mass Spectrom., 1994, 5, pp. 194-200.
Tyler, A.N., et al., Int. J. Mass Spectrom, Ion Processes, 1992, 122, pp. 25-41.
Wenzel, R.J., et al., Anal. Chem., 2005, 77, pp. 4329-4337.
Birkinshaw, K, et al, Int. J. Mass Spectrom, 2002, (1-3), 215, pp. 195-209.
Birkinshaw, K, et al, Int. Rev. Phys. Chem, 1996, 15, pp. 13-40.
Birkinshaw, K, et al, Int. J. Mass Spectrom, 1998, 33, pp. 64-74.
Birkinshaw, K, et al, Int. J. Mass Spectrom, 2004, 39, 1, pp. 91-92.
Sinha, M.P., Rev. Sci. Instrum, 76, (2), Feb. 2005, Art. No. 025103.
Darling, R.B., et al., Sens Actuators, A, 2002, 95, (2-3), pp. 84-93.
Scheidemann, A.A., et al., J. Vac. Sci. Technol., A, 2002, 20, (3), pp. 597-604.
Fuerstenau, S., et al., Int. J. Mass Spectrom., 2002, 215, (1-3), pp. 101-111.
Knight., A,K. et al., Int. J. Mass Spectrom, 2002, 215, (1-3), pp. 131-139.
Barnes, J.H. et al., Anal Chem., 2004, 76, (9), pp. 2531-2536.
Barnes, J.H. et al., Anal. Chem., 2002, 74, pp. 5327-5332.
Barnes, J.H. et al., J. Am. Soc. Mass Spectrom, 2004, 15, (6), pp. 769-776.
Barnes, J.H. et al., J. Anal. At. Spectrom, 2004, 19, (6), pp. 751-756.
Barnes, J. H. et al., Anal. Bioanal. Chem., 2004, 380,(2), pp. 227-234.
Denson, S., et al., Int. J. Ion Mobility Spectrom., 2002, 5, pp. 100-103.
Jochum, K.P., et al., Anal. Chem., 359, 1997, pp. 385.
Solyom, D.A., et al., Spectral. Anal., 22, 2002, pp. 828.
Birkinshaw, K., Int. J. Mass Spectrom., Ion Proc., 132, 1994, pp. 193.
Langstaff, D.P., et al., Meas. Sci. Technol., 5, (4), Apr. 1994, pp. 389-393.
Nevejans, D., et al., Rev. Sci. Instrum., 71, 2000, pp. 4300.
Hatfield, J.V., et al., Rev. Sci. Instrum., 63, 1992, pp. 235.
Hatfield, J.V. et al., Rev. Sci. Instrum., 63, 1992, pp. 792.
Scheidemann, A.A., et al., J. Vac. Sci. Tech. A: Surf. Films., 20, 2002, pp. 597.
Langstaff, D.P., et al, Nuclear Instruments & Methods in Physics Research Section B-Beam Interactions with Materials & Atoms, 238, (1-4), 2005, pp. 219-223.
Jewel, April D., et al., Applied Physics Letters, 88, (4), Jan. 2006, Art. No. 043501.
Birkinshaw, K., et al., Int. Jour Mass Spectrom., 181, Dec. 1998, pp. 159-165.
Sinha, et al., Int. Jour. Mass Spectrom., 176, (1-2), 1998, pp. 99-102.
Langstaff, D.P., et al., Int. Jour. Mass Spectrom., 215, (1-3), 2002, pp. 1-12.
Narayan, D.J., et al., Int. Jour. Mass Spectrom., 176, 3, 1998, pp. 161-166.
Narayan, D.J., et al., Int. Jour. Mass Spectrom., 149, 1995, pp. 439-449.
Bonner, T.F., et al., ACTA Astronautica, 32, (9), Sept. 1994, pp. 629-639.
Birkinshaw, K., et al., Int. Jour. Mass Spectrom. and Ion Processes, 136, (1), pp. 71-83 (1994).
Sinha, M.P., et al., Journal of Microcolumn Separations, 4 (5), 1992, pp. 405-410.
Sinha, M.P., et al., Rev. of Scientific Instruments, 61, (11), Nov. 1991, pp. 2618-2620.
Scheidemann, A., Abstracts of Papers of the American Chemical Society, 225, U147-U147 256-ANYL, part 1 Mar. 2003.
Fuerstenau, S.D., et al., Angewandte Chemie-International Edition, 40, (6), 2001, pp. 982.
Fuerstenau, S.D., et al., Angewandte Chemie-International Edition, 40, (3), 2001, pp. 542-544.
Schilling, G.D., et al., Analytical Chemistry, 78, (13), Jul. 2006, pp. 4319-4325.
Peschel, B.U., et al., Spectrochimica Acta Part B-Atomic Spectroscopy, 61, (1), Jan. 2006, pp. 42-49.
Sperline, R.P., Applied Spectroscopy, 59, 11, Nov. 2005, pp. 1315-1323.
Barnes, J.H., et al., American Laboratory, 35, (20): 15-+ Oct. 2003.
Barnes, J.H., et al., J. Anal. Atomic Spectrom., 18, (19), 2003, pp. 1015-1018.

* cited by examiner

METHOD AND APPARATUS FOR SIMULTANEOUS DETECTION AND MEASUREMENT OF CHARGED PARTICLES AT ONE OR MORE LEVELS OF PARTICLE FLUX FOR ANALYSIS OF SAME

This invention was made with Government support under Contract DE-AC05-76RLO1830 awarded by the U.S. Department of Energy. The Government has certain rights in the invention.

FIELD OF THE INVENTION

The present invention relates generally to a method and apparatus for simultaneous detection and measurement of charged particles at one or more levels of particle flux in a measurement cycle for analysis of same.

BACKGROUND OF THE INVENTION

Charged particle detection is necessary for the identification, monitoring, and concentration determination of chemicals, particulates, and aerosols in the gas phase. The detection of charged particles, or ions, can be accomplished using single, multiple, or array detector devices. Such ion detectors are useful in analytical instrumentation such as mass spectrometers, ion mobility spectrometers, and aerosol/particle counters, among others. Commonly desired features of ion detectors in such applications are high sensitivity, uniformity of response, high stability, and fast response.

SUMMARY OF THE INVENTION

The present invention relates generally to a method and apparatus for simultaneous detection and measurement of charged particles at one or more levels of particle flux (e.g., low, medium, high) in a measurement cycle for analysis of same. The invention finds application in, e.g., analytical instruments and associated detector systems including stages and components thereof. Instruments, stages, and components include, but are not limited to, e.g., mass spectrometry (MS) instruments; ion mobility spectrometry (IMS) instruments; and the like, or combinations thereof.

In situations where complex mixtures of charged particles exist, simultaneous observation of all ionized species is highly desirable; detection efficiency can thus be high (100%), inter-signal variation (noise) can be minimized, and artifacts associated with scanning (timing skew) can be eliminated. Described herein is a charged particle detector incorporating such characteristics, referred to as a "simultaneous" detector. In addition, levels or intensities of charged particles in complex mixtures can vary widely, complicating authentic and accurate reading of particle number (the number of charged particles) or the level of charged particles (e.g., low, medium, or high). Detection of very low particle numbers requires a highly sensitive and discriminating response. A very high level of charged particles may overwhelm or saturate detector response. A method of charged particle detection that accurately records abundance of all species, at their various low, intermediate, and high flux levels is desirable. A detection method described herein with such characteristics can be expected to provide a high linear dynamic range. Further, a detector that can be selectively set to appropriately observe and record any/all signals at an ideal scale (i.e. at a readout level that is not too low or too high for each/every observed signal) can be expected to provide a genuine and accurate recording of all charged particle signals. This capability can be achieved by automatic and judicious selection and/or setting of the amplification or gain associated with the electronics of the detector. Versatility in achieving such capability can be enabled by incorporating multiple levels of gain or amplification in the detector circuitry. A detection method incorporating such capabilities (as described herein) is referred to as "automatic" or "selective" gain, and implicitly necessitates multiple gain levels from which to choose. A charged particle detector capable of simultaneous, selective, and high dynamic range readout characteristics would be further valued if various charged particle signals could be accessed, read, and stored in a fully independent manner, rather than in a regular, fixed, or predetermined sequence (e.g. low-to-high mass or high-to-low mass or left-to right channel or right-to-left channel). With such capabilities, any detector channel(s), whether single or multiple, contiguous or not, can be accessed and read out at will for the desired purpose. Such a detector capability (described further herein) is referred to as a "random access" or an "independent access" or "fully addressable" readout capability. In one embodiment, a charged particle detector having all of the above desired detection characteristics is provided in a discrete electronics package or circuitry providing for facile detection of any type and any level of charged particles. In another embodiment, a charged particle detector having all of the above desired detection characteristics is of a hybrid design. In yet another embodiment, a charged particle detector having all of the above desired detection characteristics is fully integrated in a single (monolithic) electronic device or "chip" that includes all necessary detector circuitry.

Accordingly, in one aspect, the invention is an apparatus that includes two or more detector elements operatively disposed for detecting and measuring different and/or separated charged particles, the detector elements each including a charge-collecting element operatively disposed to an amplifying circuit. The amplifying circuit includes an integrating amplifier with one or more integrating capacitors and individually selectable switching means providing multiple and independently selectable levels of integration and/or gain for each of the detector elements. The detector elements are each independently selectable and addressable providing for simultaneous detection and measurement of charged particles at one or more levels of particle flux in a measurement cycle.

In another aspect, the invention is a process, including the steps of: providing two or more detector elements operatively disposed for detecting and measuring different and/or separated charged particles, the detector elements each including an independently selectable and addressable charge-collecting element operatively disposed to an amplifying circuit, wherein the amplifying circuit includes an integrating amplifier with one or more integrating capacitors and individually selectable switching means thereby providing independently selectable and variable integration and/or gain to each of the detector elements; reading each of the charge-collecting elements at an initial level of particle flux; adjusting the gain of the charge-collecting elements selectively and variably providing sufficient charge-collecting capability for each of the charge-collecting elements at one or more levels of particle flux. The detector elements are each independently selectable and addressable thereby providing for simultaneous detection and measurement of charged particles at one or more levels of particle flux in a measurement cycle.

In another embodiment, charged particles are selected from ions, electrons, positrons, alpha particles, aerosols, droplets, particulates, or combinations thereof.

In another embodiment, charged particles are net positive.

In another embodiment, charged particles are net negative.

In another embodiment, charge-collecting elements are configured as an array.

In another embodiment, an array of charge-collecting elements is a linear array.

In another embodiment, an array of charge-collecting elements is a curvilinear array.

In another embodiment, an array of charge-collecting elements is a 2-dimensional linear array.

In another embodiment, an array of charge-collecting elements is a 3-dimensional array.

In another embodiment, charge-collecting elements are composed of an electrically conductive material.

In another embodiment, electrically conductive material is selected from the group of alloy, single, mixed, layered, binary, or combinations thereof.

In another embodiment, an amplifying circuit is a charge-integrating amplifying circuit.

In another embodiment, a charge-integrating amplifying circuit is a capacitive transimpedance amplifying circuit.

In another embodiment, a charge-integrating amplifying circuit comprises two or more selectable charge-integrating capacitors.

In another embodiment, charge-integrating capacitors are fixed capacitors.

In another embodiment, charge-integrating capacitors are variable capacitors.

In another embodiment, a readout means is used for reading charges accumulated in two or more detector elements.

In another embodiment, a readout means is used for reading charges accumulated in two or more detector elements simultaneously, sequentially, non-sequentially, selectively, selectably, randomly and/or independently, in parallel, non-destructively, destructively, or combinations thereof.

In another embodiment, reading of charges by a readout means is non-destructive.

In another embodiment, reading of charges by a readout means is destructive.

In another embodiment, a resetting means discharges charges accumulated in each of two or more detector elements providing a zero net charge therein.

In another embodiment, the invention comprises a storage means for storing data representative of charges accumulated in each of the two or more detector elements.

In another embodiment, a switching multiplexer is coupled to a computing means for automated selection and operation of the switching multiplexer.

In another embodiment, a switching multiplexer is configured as a discrete unit from the two or more detector elements.

In another embodiment, a switching multiplexer is configured as a hybrid unit with the two or more detector elements.

In another embodiment, a switching multiplexer is fully integrated with the two or more detector elements in a single, monolithic, or one-piece chip or circuit.

In another embodiment, a switching multiplexer includes devices selected from the group of selectable switch, polarity switch, resetting switch, read-out switch, charge-integrating capacitor, or combinations thereof.

In another embodiment, a measurement cycle is a single measurement cycle.

In another embodiment, a measurement cycle is a repetitive measurement cycle.

In another embodiment, a measurement cycle is a repeatable measurement cycle.

DETAILED DESCRIPTION

The present invention relates generally to a method and apparatus for simultaneous detection and measurement of charged particles at one or more levels of particle flux (e.g., low, medium, high) in a measurement cycle for analysis of same.

Figure 1:
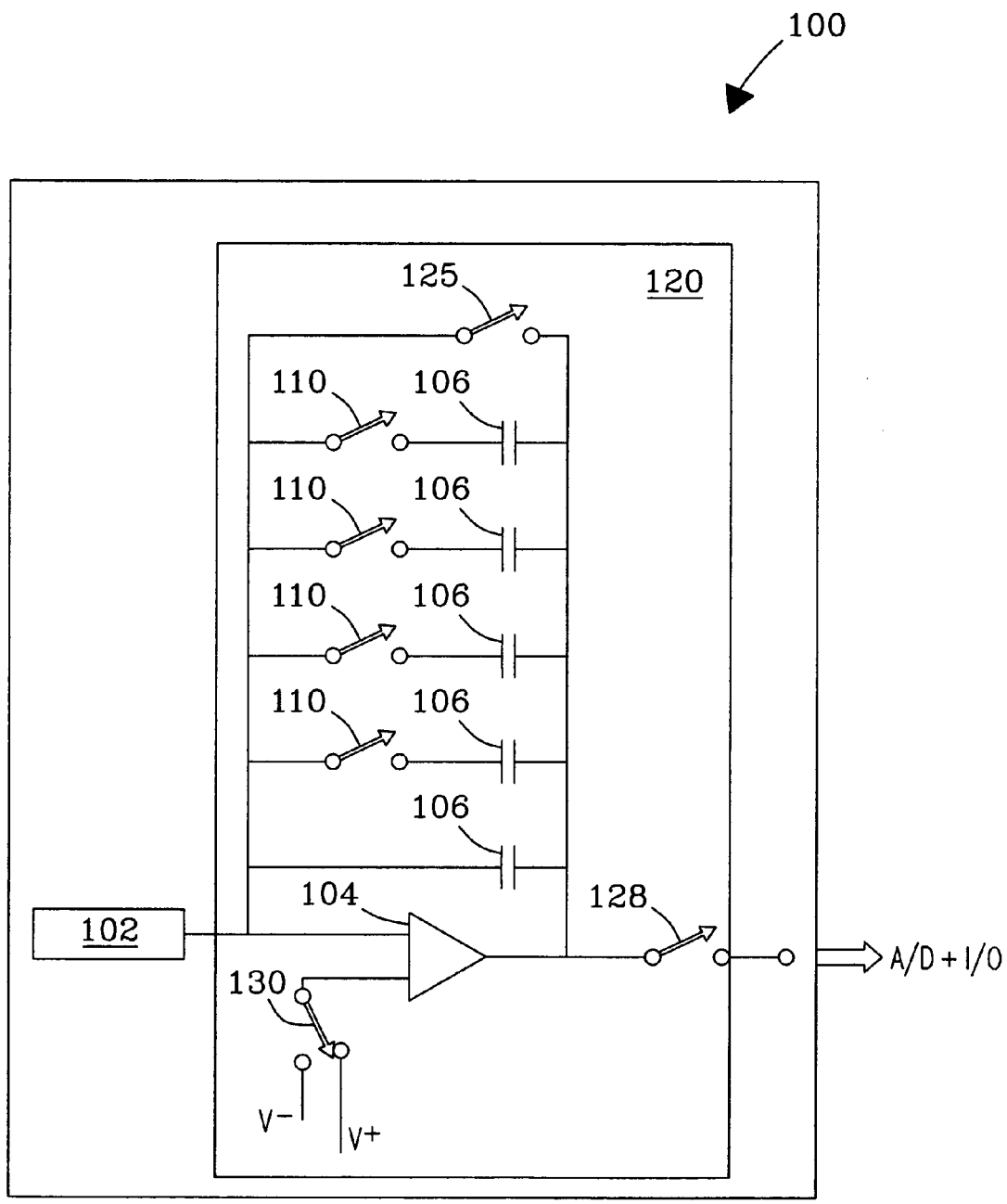
FIG. 1 illustrates a single detector element comprising a charge collecting element and a multiple gain amplifying circuit, according to one embodiment of the invention.

FIG. 1 illustrates a detector element 100 operative as a component of a charged-particle detector for detecting and measuring charged particles at one or more levels of particle flux, according to one embodiment of the invention. Charged particles include, but are not limited to, e.g., ions, electrons, positrons, alpha particles, aerosols, droplets, particulates, or combinations thereof. In one mode of operation, for example, detector element is configured for measuring charged particles having a net positive charge. In another mode of operation, detector element is configured for measuring charged particles having a net negative charge. Detector element 100 includes a charge-collecting element 102 and an amplifying circuit 120 for accumulating and integrating electrical charges from charged particles. The term "charge-collecting element" or "collector element" or "collector" means an electrode capable of collecting charged particles at one or more levels of particle flux for detection. The term "particle flux" as used herein refers to any of a number of particles or a stream of particles (e.g., in a beam) incident on a charge-collecting element per unit time. Collector elements include, but are not limited to, e.g., "Faraday strips or plates" or the like. Charge-collecting element is composed of an electrically conductive material, including, but not limited to, e.g., alloys, single conductive materials, mixed conductive materials, layered conductive materials, binary conductive materials, or combinations thereof. No limitations are intended.

As will be appreciated by those of skill in the art, amplifying circuit 120 may be of any design incorporating components and/or characteristics described herein. In one embodiment, amplifying circuit is a charge-integrating amplifying circuit. In another embodiment, amplifying circuit is a capacitive transimpedance amplifying (CTIA) circuit. No limitations are intended. Amplifying circuit 120 includes an amplifier 104 for balancing charge, and one or more integrating capacitors 106 providing a range of selectable capacitance values and thus multiple levels of gain for accumulating charge in the detector element. The term "integrating capacitor" means a capacitor having an input and an output, the input having a capacitance value equal to the output capacitance times the voltage gain of the amplifier coupled thereto. Integrating capacitors include, but are not limited to, e.g., variable capacitors, fixed capacitors, or the like. The term "variable capacitor" means any integrating capacitor having a capacitance value that can be varied. The term "fixed capacitor" means any integrating capacitor having a fixed (non-varying) capacitance.

In the instant embodiment, one or more integrating capacitors 106 within charge-amplifying circuit 120 are each electrically coupled to individually selectable switching means 110 or switching components (e.g., switches, switching transistors, field effect transistors, or the like) providing multiple and independently selectable levels of gain suitable for measuring and integrating various levels of particle flux encountered at charge-collecting element 102 of detector element 100. The term "gain" as used herein refers to the output voltage ($V_{out}$) by the amplifying circuit per net unit charge incident upon a charge collecting element. Gain in each amplifying circuit is inversely proportional to the total selected capacitances in the feedback loop (capacitive and/or integrating components) within the amplifying circuit, as denoted by equation [1]:

$$V_{out} = k \times \frac{e}{C} \quad [1]$$

In equation [1], (e) is the charge measured within the amplifying circuit, (C) is the capacitance, and (k) is the proportionality constant. Amplifying circuit converts accumulated charge to a voltage that can be measured, e.g., in conjunction with an A/D converter yielding a net voltage per unit charge (e.g., 1.5 µV/unit charge) as the gain output. In an illustrative example, an amplifying circuit having multiple fixed capacitors 106, capacitance of the circuit is the sum of the selected capacitances therein. In the figure, one integrating capacitor within the amplifying circuit is not coupled to a switching means. In this configuration, the capacitor provides a minimum charge accumulating capacity to the amplifying circuit; capacitance is added to the sum of the capacitances of any capacitors selected in conjunction with switching means. When two capacitors therein are selected having capacitances of magnitude, e.g., 10× and 100×, respectively, the amplifying circuit provides two user-selectable gain settings with a total capacitance in the selected configuration of magnitude 110× (10×+100×). Capacitors having the lowest capacitance provide the highest gain setting. Capacitors having the highest capacitance provide the lowest level of gain. Thus, for low levels of particle flux, a high gain setting is desired. Conversely, for high levels of particle flux, a low gain setting is preferred. Combinations of selected capacitors provide for intermediate levels of particle flux simultaneously. Gain is selectively adjusted by opening and closing (connecting or disconnecting) selected switches 110 thereby increasing or decreasing gain suitable for the incident charges. With respective magnitudes of 10× and 100× respectively, capacitances differ by approximately a factor of 100, so gains of X (low gain) and 100× (high gain) are achievable for each collecting element 102 (channel) independently. In another alternate configuration, three capacitors may be selected having individual capacitances of 10×, 20×, and 50×, for example, providing a total capacitance of 80× to the amplifying circuit for measuring particle flux. No limitations are intended. Number of capacitive components is not limited. For example, any combination of capacitors can be selected, e.g., a first two, a last two, a first and a third, or a first, a second, and a third, or any combinations of available capacitive components within the circuit. Amplifying circuits 120 provide multiple levels of gain for accumulating and integrating charges. As will be understood by those of skill in the art, capacitances are selected concomitant with the amount of anticipated charge or amount of charge being detected and the design of the applicable detection circuitry and/or the analytical instrument dynamics. In general, capacitors and capacitances may be of any range. In particular, capacitances range from about 1 fF to about 10,000 fF. More particularly, capacitances range from about 1 fF to about 1,000 fF. No limitations are intended. Further, the capacitive components are not limited. All components as will be implemented by those of skill in the art are encompassed hereby. No limitations are intended.

Amplifying circuit 120 further includes a reset means 125, an input/output (I/O) (switching) means 128, and a mode selecting means 130. Resetting means 125 (e.g., a reset switch) provides for discharging of accumulated charge from capacitors 106 resetting the amplifying circuit to a zero net charge. Input/output means 128 provides a gate for measurement of voltage output from the amplifying circuit, e.g., in conjunction with data acquisition, A/D conversion, I/O, and control devices and/or components. Mode selecting means 130, e.g., a polarity switch, provides for selection of the charge type to be measured or accumulated, whether positive (i.e., v+) or negative (v−) charge accumulation. Reset means 125, I/O means 128, and mode selecting means 130 further provide selectability to the amplifying circuit allowing for 1) continued charge accumulation and/or integration within specified capacitors; 2) resetting of selected and/or different capacitors; and/or 3) total discharge of accumulated charges within the amplifying circuit. Selectability of the amplifying circuit allows for random resetting (rapid discharging of integrating capacitor) and restart of integration to achieve extremely wide dynamic ranges for measurement of e.g., disparate levels of particle flux in, e.g., two or more coupled detector elements.

Electrical charges are thus accumulated and integrated by detector element 100. Particle flux is correlated with measurement of the quantity of collected and/or accumulated charges in the detector element during a measurement cycle. For example, a higher rate of particle arrival increases the accumulated charge within detector element. Control over the various switching components 125 128 130 permit charge accumulation and integration to any specified level. Further, the amplifying circuit further ascertains when resetting becomes necessary to prevent saturation in detector element 100 or its associated circuitry and/or electronics, i.e., generating an over range or nonlinear region.

Charges within amplifying circuit 120 may be read non-destructively or destructively, as will be understood by those of skill in the art. The term "non-destructive readout" (NDRO) or "non-destructive read" refers to a reading of accumulated particle charge(s) within integrating capacitors 106 of the amplifying circuit without clearing charges accumulated therein. The term "destructive read-out" or "destructive read" refers to a reading of accumulated particle charge (s) within integrating capacitors of the amplifying circuit and clearing of charges accumulated therein. For example, NDRO can be used to perform multiple reads of accumulated charges in the amplifying circuit of a given detector element to profile charge collection therein. In addition, multiple NDROs can reduce noise improving precision of measurements. Since noise is largely random, averaging multiple readouts drops effective read noise by a factor of $1/\sqrt{N}$, where N is the number of reads.

Integration (times) periods (e.g., wherein charges are accumulated and read) are selectable. The term "integration period" defines the time interval between a destructive readout and a subsequent destructive readout. In cases of high particle flux, for example, integration period may be short. That is, multiple destructive reads may be required. In an instance of low particle flux, conversely, integration period may be long or varied randomly to provide sufficient charge accumulation. Data for each integration period corresponding to accumulated charges may be collected and stored for further analysis in conjunction with data acquisition devices and control systems known to those of skill in the art. Thus, particle flux at each collecting element (collector) can be individually determined. Upon completion of the integration period, each collector may be reset, by engaging switching means 125 thereby draining all charge from amplifying circuit 120 or alternatively engaging mode selecting means 130 to select an alternative charge particle accumulation.

Figure 2:
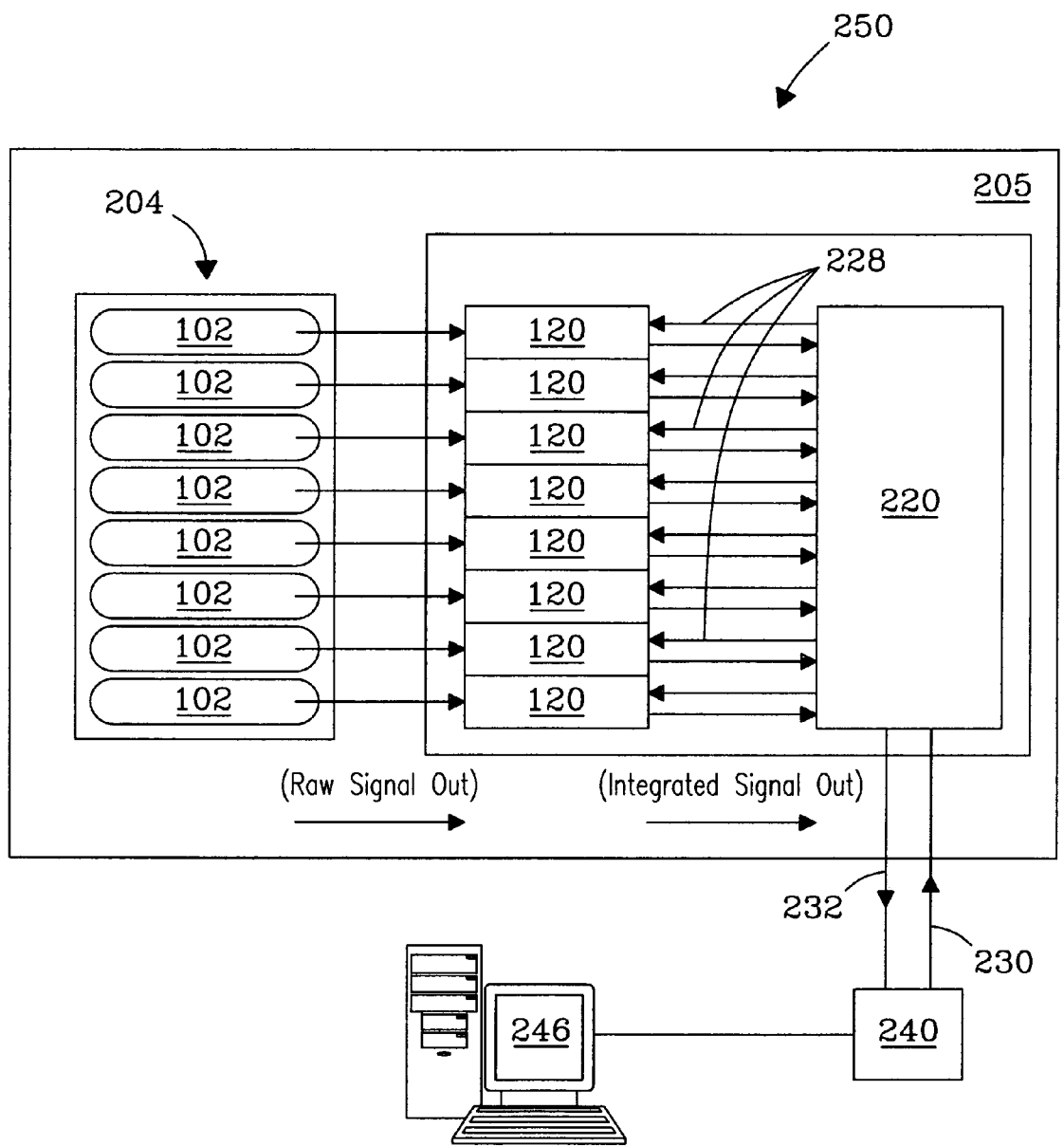
FIG. 2 illustrates a system of a generalized configuration for detecting, integrating, and measuring accumulated charged particles, including an array of single detector elements configured as detection circuitry, according to an embodiment of the invention.

FIG. 2 illustrates a detector system of a generalized configuration for detecting, integrating, and measuring accumulated charged particles, according to an embodiment of the invention. System 250 includes two or more charge-collecting elements 102 configured, e.g., in an array 204 of single detector elements. Array configurations include, but are not limited to, e.g., linear arrays, curvilinear arrays, 2-dimensional arrays, 3-dimensional arrays, or the like. No limitations are intended. Charge collecting elements couple electrically to respective amplifying circuits 120 controlled via a switching multiplexer 220. The term "switching multiplexer" as used herein refers to a device, component, or circuit for selecting which switches of an amplifying circuit are engaged or not engaged at any time during a measurement cycle, thereby providing multiple and independently selectable levels of integration and/or gain for components coupled thereto, as described herein. In the instant configuration, amplifying circuits 120 and switching multiplexer 220 couple within an amplifier-multiplexer circuit 225, but is not limited thereto. The amplifier-multiplexer circuit and/or switching multiplexer provide selective and independent control via of individual amplifying circuits including switching means and components thereof via one or more (input) control lines 228 interfacing thereto. Components include, but are not limited to, e.g., reset switches, input/output gates, mode switches, polarity switches, capacitive switches, or like components within individual amplifying circuits. No limitations are intended. Charge collecting elements 102, amplifying circuits 120, and switching multiplexer 220 within amplifier-multiplexer circuit 225 in combination define detection circuitry for a detector 205 operable for detecting, integrating, and measuring charged particles. The amplifying circuits provide multiple and selectable levels of gain for accumulation of charged particles and integration thereof. The amplifier-multiplexer circuit further provides independent selection of individual amplifying circuits, including components thereof (e.g., switching means, reset means, gate means, and/or mode selecting means therein described previously with respect to FIG. 1). In the figure, multiplexer 220 of amplifier-multiplexer circuit 225 optionally couples to various control devices as will be implemented by those of skill in the art. For example, switching means and components within the amplifier-multiplexer circuit may be controlled via instructions from one or more (input) control lines 230 that interface with, e.g., A/D conversion, logic, I/O, and/or control device 240 (e.g., a Cyclone™ FPGA chip, Altera Corp., San Jose, Calif., USA) and/or circuits and a computer 246 (e.g., a Dell Optiplex GX260 personal computer, Dell, Round Rock, Tex., USA). Data outputs from the amplifier-multiplexer circuit may be transported via one or more output lines 232 to, e.g., an A/D converter present in the control device 240 or circuit and input to the computer, e.g., in conjunction with an I/O device thereof (not shown) (e.g., a model NI-PCI-6534 or NI-PXI-6534 data acquisition card, National Instruments Corp., Austin, Tex., USA) and control/analysis software (e.g., LabVIEW®, National Instruments Corp., Austin, Tex., USA). All device configurations as will be implemented by those of skill in the art are within the scope of this disclosure. No limitations are intended. For example, components that provide for gain selection, opening/closing of selected gates and/or switches, resetting of amplifying circuits, mode selection, and the like can be integrated within amplifier-multiplexer circuit 225 of detector 205 or retained as discrete components, as described further with reference to FIGS. 3a-3c.

Figure 3A:
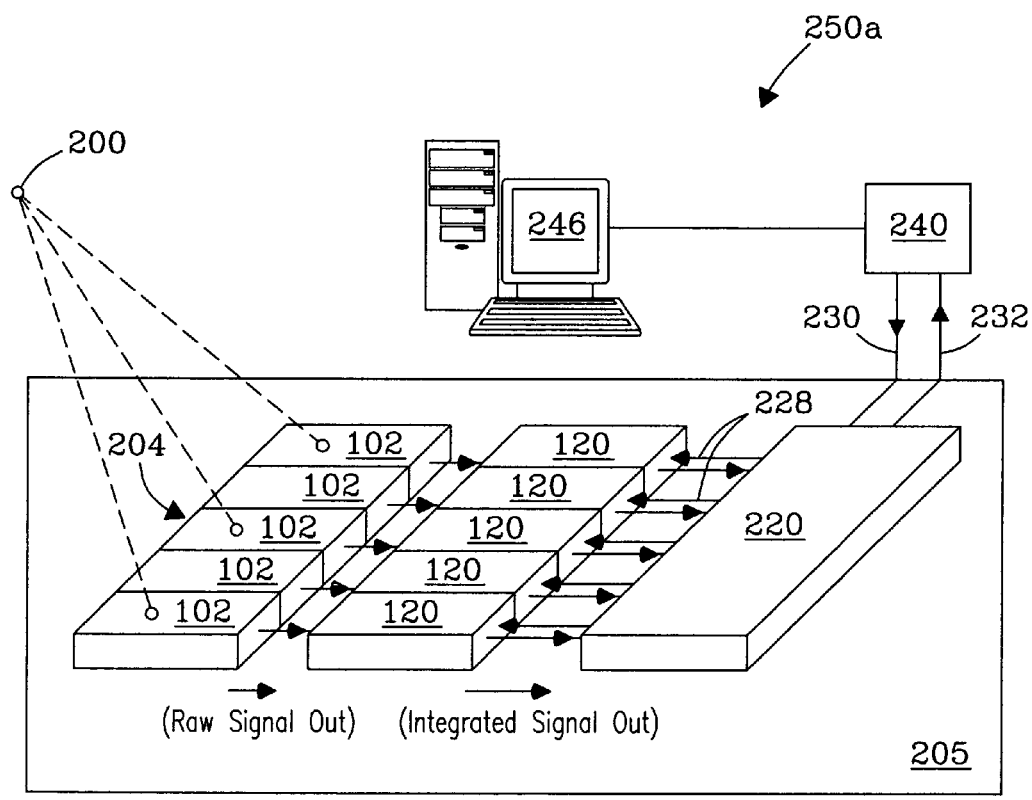
FIGS. 3a-3c present specific system configurations for detection and measurement of charged particles, including arrays of charge collecting elements and detection circuitry of various designs, according to different embodiments of the invention.
Figure 3B:
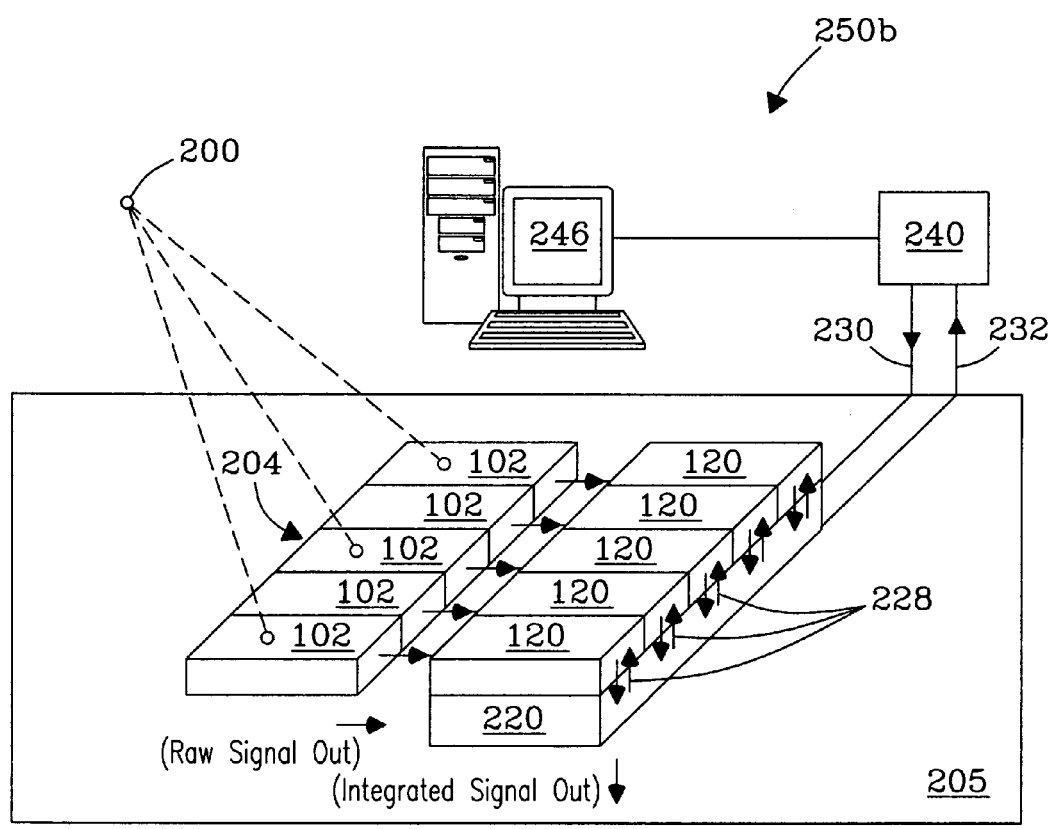
Figure 3C:
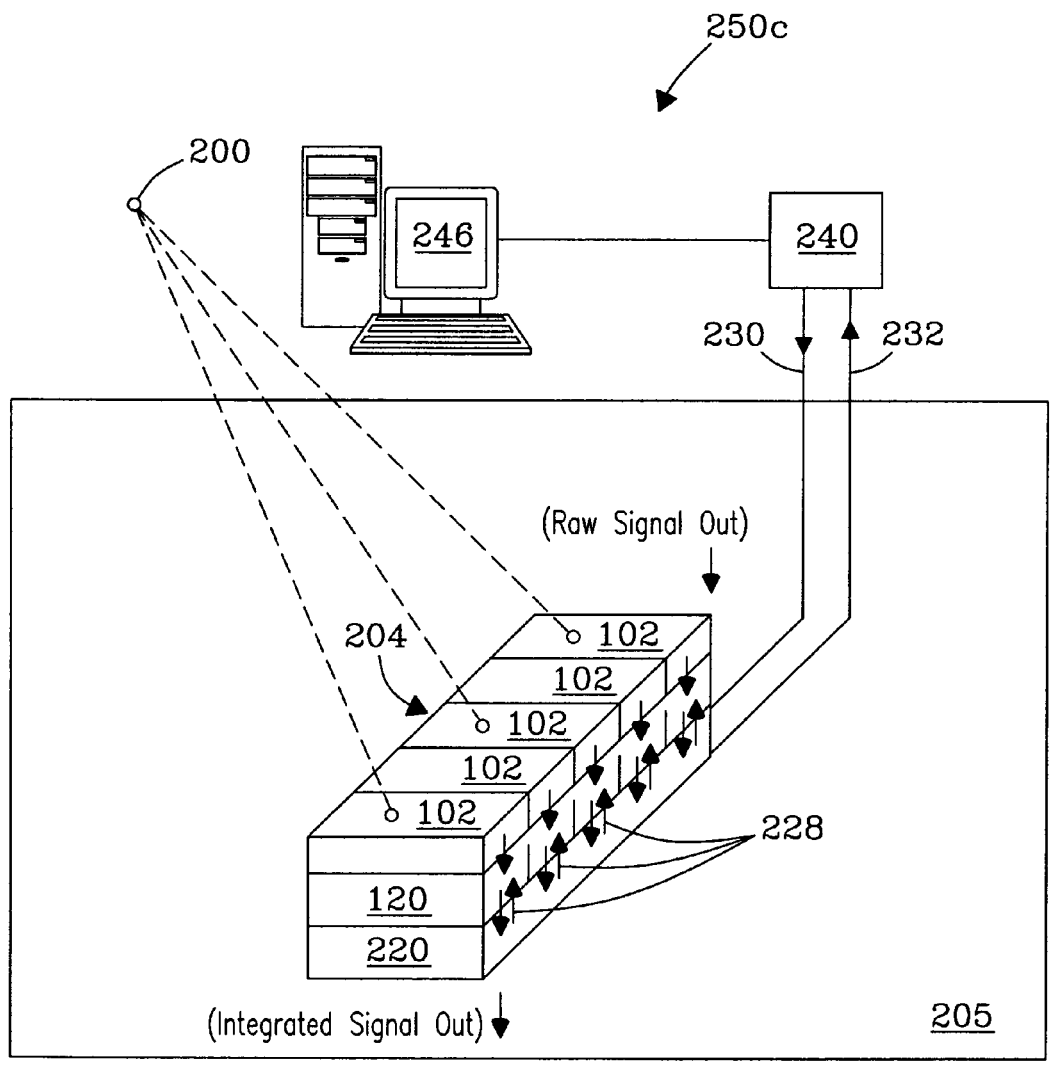

FIGS. 3a-3c illustrate different configurations 250a-250c of a charged-particle detector system for detecting, integrating, and measuring charged particles 200, according to three embodiments of the invention. Detector systems 250a-250c comprise two or more closely spaced charge-collecting (collector) elements 102 (e.g., gold Faraday collector strips) configured, e.g., in an array 204. In the instant embodiments, array 204 is of a linear design, but is not limited thereto. Individual charge-collecting elements are each coupled to an amplifying circuit 120 which further couples to a switching multiplexer 220 or circuit providing selectability and control of individual amplifying circuits, including switching components thereof, providing for simultaneous charge accumulation and integration at one or more levels of particle flux. Amplifying circuits 120 and switching multiplexer 220 may be coupled together, e.g., within an amplifier-multiplexer circuit or component, as described previously herein, but is not limited thereto. Particles 200 impinging upon collecting elements 102 are generated, e.g., from any ion source (e.g., an inductively coupled plasma, ICP) or instrument (e.g., a mass spectrometer), described further with reference to FIG. 4 hereinbelow.

FIG. 3a illustrates a first charged-particle detector system 250a, according to an embodiment of the invention. In the instant embodiment, detector 205 including detection circuitry and electronics is of a side-by-side (discrete) design. Charge collecting elements 102 of array 204, are distinct from, but coupled to, amplifying circuits 120 including switching means and/or components thereof (described previously with reference to FIG. 1). Amplifying circuits 120 are distinct from, but coupled to, a switching multiplexer 220.

Amplifying circuits 120 and multiplexer 220 may be optionally configured within an amplifier-multiplexer circuit or component (described previously with respect to FIG. 2), but is not limited. Array 204 of charge collecting elements 102 is positioned within detector 205 for collecting charged particles 200 impinging any of the collector elements. Switching multiplexer (or amplifier-multiplexer) 220 provides selective and independent control of switching components employed within amplifying circuits 120 via one or more control lines 228 that interface thereto. Multiplexer further couples to, e.g., an A/D conversion, logic, and/or control device or component 240 (e.g., a Cyclone™ FPGA chip, Altera Corp., San Jose, Calif., USA). Instructions from control device 240 to the multiplexer and to the amplifying circuits for control thereof are provided via one or more input or control lines 230. Data read from switching multiplexer (or amplifier-multiplexer) 220 are output via one or more output lines 232 to the A/D conversion, logic, and/or control device or component 240 and subsequently input to a computer 246 (e.g., a Dell Optiplex GX260 personal computer, Dell, Round Rock, Tex., USA) in conjunction with a computer I/O device (not shown) (e.g., a PCI-6534 data acquisition card, National Instruments Corp., Austin, Tex., USA) controlled in conjunction with, e.g., control/analysis software (e.g., LabVIEW®, National Instruments Corp., Austin, Tex., USA). All configurations as will be implemented by those of skill in the art are within the scope of the disclosure. No limitations are intended.

FIG. 3b illustrates a second charged-particle detector system 250b, according to another embodiment of the invention. In the instant embodiment, detector 205 including detection circuitry and electronics is of a hybrid or partially integrated design. Amplifying circuits 120 are operatively coupled to switching multiplexer 220 apart, or distinct from, an array 204 of charge-collecting elements 102. Amplifying circuits 120 and multiplexer 220 may be optionally configured within an amplifier-multiplexer circuit or component (described previously with respect to FIG. 2), but is not limited. Array 204 of charge collecting elements 102 is positioned within detector 205 for collecting charged particles 200 impinging any of the collector elements. Switching multiplexer (or amplifier-multiplexer) 220 provides selective and independent control of amplifying circuits 120, including switching components thereof, via one or more control lines 228 that interface thereto. Multiplexer further couples to, e.g., an A/D conversion, logic, and/or control device or component 240 (e.g., a Cyclone™ FPGA chip, Altera Corp., San Jose, Calif., USA). Instructions from control device 240 to the multiplexer and to the amplifying circuits for control thereof are provided via one or more input or control lines 230. Data read from switching multiplexer (or amplifier-multiplexer) 220 are output via one or more output lines 232 to the A/D conversion, logic, and/or control device or component 240 and subsequently input to a computer 246 (e.g., a Dell Optiplex GX260 personal computer, Dell, Round Rock, Tex., USA) in conjunction with a computer I/O device (not shown) (e.g., a PCI-6534 data acquisition card, National Instruments Corp., Austin, Tex., USA) controlled in conjunction with, e.g., control/analysis software (e.g., LabVIEW®, National Instruments Corp., Austin, Tex., USA).

FIG. 3c illustrates a third charged-particle detector system 250c, according to yet another embodiment of the invention. In the instant embodiment, detector 205 including detection circuitry and electronics is of a fully integrated, monolithic, or one-piece design. Charge-collecting elements 102 are configured as an array 204 of charge-collecting elements. Charge-collecting elements 102 are operatively coupled to respective amplifying circuits 120 that further couple to switching multiplexer 220. Array 204 may be optionally configured within an amplifier-multiplexer circuit or component (as described previously with respect to FIG. 2), but is not limited. Array 204 of charge collecting elements 102 is positioned within detector 205 for collecting charged particles 200 impinging any of the collector elements. Switching multiplexer (or amplifier-multiplexer) 220 provides selective and independent control of amplifying circuits 120, including switching components thereof, via one or more control lines 228 that interface thereto. Multiplexer further couples to, e.g., an A/D conversion, logic, and/or control device or component 240 (e.g., a Cyclone™ FPGA chip, Altera Corp., San Jose, Calif., USA). Instructions from control device 240 to the multiplexer and to the amplifying circuits for control thereof are provided via one or more input or control lines 230. Data read from switching multiplexer (or amplifier-multiplexer) 220 are output via one or more output lines 232 to the A/D conversion, logic, and/or control device or component 240 and subsequently input to a computer 246 (e.g., a Dell Optiplex GX260 personal computer, Dell, Round Rock, Tex., USA) in conjunction with a computer I/O device (not shown) (e.g., a PCI-6534 data acquisition card, National Instruments Corp., Austin, Tex., USA) controlled in conjunction with, e.g., control/analysis software (e.g., LabVIEW®, National Instruments Corp., Austin, Tex., USA).

Charged particle detectors 205 described herein can be used in conjunction with an instrument or analysis system for detecting and measuring charged particles, which will now be described with reference to FIG. 4.

Figure 4:
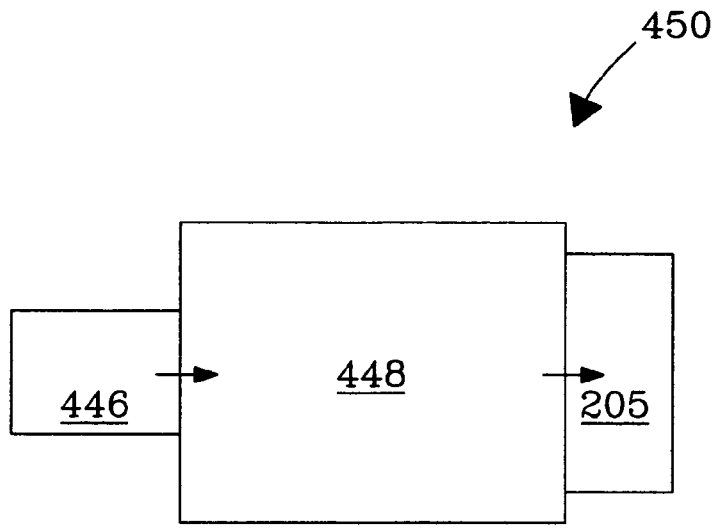
FIG. 4 illustrates a complete system according to an embodiment of the invention for detecting and measuring charged particles, including an ion source, a mass separation stage or instrument, and a charged particle detector.

FIG. 4 illustrates an instrument analysis system 450 illustrative of configurations providing for supply, spatial separation, and analysis of charged particles, according to one embodiment of the invention. System 450 provides for generation, detection, charge accumulation, integration, and simultaneous measurement of charged particles at one or more levels of particle flux. System 450 is configured with an ion source 446 for generating and providing charged particles. Ion sources include, but are not limited to, e.g., Inductively Coupled Plasma (ICP), ElectroSpray Ionization (ESI), Matrix-assisted Laser Desorption Ionization (MALDI), Atmospheric Pressure MALDI (AP-MALDI), Electron Impact (EI), Chemical Ionization (CI), or the like, but are not limited thereto. Ion source 446 couples, e.g., to a mass separation/selection device, stage, or instrument 448 (e.g., a mass spectrometer, MS) providing separation of charged particles as a function of mass (e.g., m/z) received from the ion source. As will be understood by those of skill in the art, mass separation devices, stages, or instruments of any class may be coupled in conjunction with the invention, including, but not limited to, e.g., mass spectrometers (MS), mass filters, mass storage, mass isolation, tandem instruments, or combinations thereof. Analytical devices or instruments known to those of skill in the art can be selected without limitation. The selected analysis instrument couples to a detector 205 that includes components described herein providing selectability and multiple levels of gain and integration to the selected instrument system. No limitations are intended. In one illustrative instrument system tested in conjunction with the invention, ion source 446 was, e.g., an ICP. The selected mass separator 448 was, e.g., a Mattauch-Herzog geometry mass spectrograph (MHMS) providing for spatial separation of charged particles (e.g., ions) as a function of mass (m/z). Detector 205 included, e.g., 128 Faraday strips (collecting elements or collectors) configured in an array ("FPC-128") connected to a custom semiconductor chip with 128 amplifying circuits (described previously with respect to FIG. 1) supporting versatile integration and readout capabilities with multiplexer functionality. Detector 205 was placed at the focal plane within the (e.g., 6-inch focal plane) MHMS instrument. The detector utilizes 45-μm wide collectors set on 50-μm centers, thereby providing higher spatial resolution, less inter-collector dead space, and correspondingly better spectral definition. Length of each collector was increased to span the height of the magnetic sector and the entrance slit of the MHMS 448, enabling more of the charged-particle stream (beam) to be collected. The detector was further of a simple dual-gain (e.g., CTIA) design configured with relative capacitances of 1× and 100×, respectively. The instant detector configuration permits the instrument system to acquire signal (response) on all collecting elements at a frequency greater than 2 kHz and the ability to independently adjust the gain level of each collecting element. TABLE 1 lists component specifications for the detector.

TABLE 1

Detector specifications for a 128-detector element array detector.

| Collector Elements: | 128 |
|---|---|
| Collector Width, (μm) | 45 |
| Collector Height, (mm) | 6.35 |
| Collector Area, (mm$^2$) | 0.286 |
| Inter-collector Spacing, (μm) | 5 |
| Length of Collector Array, (mm) | 6.4 |

The inductively coupled plasma (ICP) 446 is sustained using an RF power supply [e.g., a 2500D and a 2500E impedance-matching network available from PlasmaTherm (St. Petersburg, Fla., USA)]. Argon (99.998%, Airgas, Radnor, Pa., USA) is supplied to the ICP torch via three mass flow controllers (e.g., a model 1179A mass flow controllers, MKS, Andover, Md., USA) operated with a multi gas-controller unit (e.g., a model 647A, MKS, Andover, Md., USA). Gas flows in the outer, intermediate, and central channels of the ICP torch are 16-18 L/min, 1.1-1.5 L/min, and 0.7-1.2 L/min, respectively. The MHMS was constructed as detailed, e.g., by Burgoyne et al. (*Journal of the American Society for Mass Spectrometry* 1997, 8, 307-318) and Solyom et al. (*Spectrochimica Acta, Part B: Atomic Spectroscopy* 2001, 56B, 1717-1729), incorporated herein, with an interface consisting of three differentially pumped stages separated by a 0.5 mm skimmer cone and a 1.0 mm third-stage aperture. Ions were sampled from ICP 446 plasma via a 0.75-mm sampling cone and accelerated into the energy and mass analyzing sectors by maintaining the sampler and skimmer cones at a 1.0 kV-1.2 kV potential. Operation of the 128 collecting element array detector 205 relies on two user-defined parameters to set the integration period. Parameters are set by means of a custom-written LabVIEW® (National Instruments Corp., Austin, Tex., USA) program interfaced with detector through a data acquisition card described hereinabove. Integration period is defined by the number of non-destructive read-outs (NDRO) and the time interval between each pair. The output file contains the value of each NDRO, therefore, particle flux on each collector can be individually determined. Upon completion of all NDROs, each collector is reset, by shorting all capacitors to ground, thereby removing all charge. The LabVIEW® software enables several repetitions of the measurement cycle to be automatically made. The shortest integration period using all channels of 128-detector element array detector is roughly 500 μs, but shorter integrations can be taken if less than all 128 channels are used. TABLE 2 lists typical operating parameters/conditions for the test configuration.

TABLE 2

Exemplary Operating Conditions of a Detector System using an ICP ion source, coupled to a 128-detector element array detector in a Mattauch-Herzog geometry mass spectrograph configuration.

| Sample Introduction System | Operating Conditions |
|---|---|
| Sample Uptake Rate | 1 mL/min |
| USN$^a$ Chamber Temperature | 160° C. |
| USN Condenser Temperature | 5-10° C. |
| Inductively Coupled Plasma Source | |
| Forward Power | 1.25 kW |
| Reflected Power | <5 W |
| Central-Channel Gas Flow | 0.7-1.2 L/min |
| Intermediate-Channel Gas Flow | 1.1-1.5 L/min |
| Outer-Channel Gas Flow | 16.0-18.0 L/min |
| Sampling Depth | 10-12 mm ALC$^b$ |
| Mass Spectrograph | |
| Sampler-cone Orifice | 0.75 mm |
| Skimmer-cone Orifice | 0.50 mm |
| Third-stage Aperture Orifice | 1.0 mm |
| First-stage Pressure | 1-2 Torr |
| Second-stage Pressure | 2-5 × 10$^{-3}$ Torr |
| Third-stage Pressure | 0.8-5 × 10$^{-6}$ Torr |
| Entrance Slit Width | 50 or 100 μm |
| Acceleration Potential | 1.00-1.20 kV |

$^a$USN—Ultrasonic nebulizer
$^b$ALC—distance above the load coil

Sample Introduction. Aqueous samples are introduced into the plasma by an ultrasonic nebulizer [e.g., a U-6000AT ultrasonic nebulizer (USN)] available commercially (Cetac, Omaha, Nebr., USA) with the evaporation and condensation units operated at 160° C. and 5-10° C., respectively. Sample and waste flows to and from the USN are regulated by means of a peristaltic pump (e.g., a model RP-1 four-head peristaltic pump, Rainin, Emeryville, Calif., USA) operated at a sample uptake rate of 1.0 ml/min.

Standard Solutions. A 0.1 M HNO$_3$ solution was used to prepare all analytical standards through serial dilution. The 0.1 M HNO$_3$ solution was prepared by dilution of purified reagent-grade nitric acid (70%, Mallinckrodt Baker Inc., Phillipsburg, N.J., USA). Purification was achieved by sub-boiling distillation in a Teflon still (e.g., a model SBS-108 still, Savillex, Minnetonka, Minn., USA). For the measurement of limits of detection, resolution, and isotope-ratio accuracy, serial dilution of 1×10$^5$ ng mL$^{-1}$ multi-elemental standards (Spex Certiprep, Metuchen, N.J., USA) were used. For isotope-ratio precision studies, a 1×106 ng mL$^{-1}$ atomic absorption silver standard (Johnson Matthey Electronics, Ward Hill, Mass., USA) was diluted to 1×10$^3$ ng mL$^{-1}$. For the determination of dynamic range, a 1000 μg mL−1 holmium atomic absorption standard was used to make solutions varying in concentration from about 1×10$^{-3}$ ng mL$^{-1}$ to about 5×10$^3$ ng mL$^{-1}$. All data were background-subtracted using the 0.1 M HNO$_3$ solution as a blank. Signal levels were determined for each collecting element by performing linear regression through the charge vs. time ramps output by the software. The slope of the regression line corresponds to the particle flux incident on each collector, and when multiplied by the integration period, gives the total signal level over that period. Regression analysis is useful for minimizing read noise of the detector.

Detector Noise

To reduce detector noise, a Peltier cooler can be placed on the backside of the circuit board or chip containing the collecting elements. Heat from the "hot" side of the Peltier cooler is optionally carried out of the vacuum chamber by means of a heat pipe. The heat pipe may then be cooled e.g., by a heat sink and fan or water cooled via copper tubing coiled around the pipe. A temperature sensor may be optionally used to directly read temperature of the collector chip or to ensure effectiveness of the cooling system.

In the test configuration comprising the FPC-128 array detector, noise was first characterized independently of noise that might arise from the ICP ion source. This was accomplished by operating the FPC-128 array detector mounted in the MHMS, but with the ICP off. Sampling orifice of the MHMS was blocked and pressure in the detector chamber was in the tens of nTorr for these studies. Noise values were taken as the standard deviation of ten replicates for various integration times. Read noise was reduced by using the regression method described hereinabove to determine background level. Another method for reducing read noise would be to extinguish ion flux after a chosen integration period and to average data acquisitions from many non-destructive read outs of accumulating charges. Noise followed square-root dependence with integration periods of 5 seconds or more. Typical noise values for 10-second integration periods were between 60 charges and 100 charges. Major frequencies in the noise spectrum were found to be from about 60 Hz and 180 Hz indicating that environmental noise is at present still a limiting factor. White-noise declined exponentially with increasing Peltier-cooler current until a current of 1.70 A was reached. Noise studies were repeated while ions were sampled from the ICP, but no significant differences were observed. Findings suggest that ions scattered in the mass spectrometer are not a significant factor.

Additional features of the dual gain detector in the test configuration will now be detailed.

Peak Shape

Shape of individual m/z peaks was evaluated by fitting points output by the collecting elements (collectors) with Gaussian and Lorentzian functions. Peak shape is affected by ion-impact liberation of electrons from the surface of the collectors. In such cases, the peak displays a small negative dip on the low-mass side, believed to be due to sputtered electrons curling backwards in the presence of the magnetic field and landing on an adjacent collector. This negative signal was observed only at low magnetic field strengths. At high magnetic field strengths, electrons do not have sufficient energy to reach an adjacent collector. This phenomenon can affect peak shape by making it asymmetric about the maximum; however, electron release did not occur at a great enough rate to make this sort of distortion observable. Peak shape can also be effected by collector crosstalk. Crosstalk between collectors refers to any inaccurate output from a collector caused by any influence by collected charge on an adjacent collector. The magnitude of crosstalk in the test configuration was determined by placing a slit in front of the detector, e.g., at the focal plane of the array. The slit is preferably sufficiently narrow to expose a single collector. However, limits in slit widths and positioning accuracy in the test configuration did not permit exposure of a single collector, so a slit of 150 µm was used, which exposed 3-4 collectors. No observable signal was seen on any unexposed collectors, meaning little or no collector crosstalk occurred. Unexposed collectors were 2-3 collectors away from the intense signal.

Array Bias

Inter-channel bias of the detector array was mapped by using a magnetic field to scan the $^{165}$Ho peak across all collecting elements of the detector. Because signal from the ICP is not perfectly stable, 25 repetitions on each collector were averaged to determine response. Average response varied from channel to channel by about 11% RSD across the collector array. Moreover, there was a slight and nearly linear rise in response from the low-mass to high-mass ends of the array. The averaged response values were normalized to the signal from the first pixel and fit by means of linear regression to the pixel number, leading from the low-mass end of the array. The slope of the regression line was 0.0029 per channel. Thus, the signal from the second channel produced an average signal that was 1.0029 times the signal from pixel 1. This slight bias across the collectors most likely arises because the plane of the detector array does not exactly coincide with the focal plane of the MHMS.

Limits of Detection

The 128-element array detector employs pixels that span the entire height of the magnetic sector of the MHMS. Ten repetitions of a 10-second integration period were used to determine limits of detection (LOD) at a $3\sigma$ level. Signal and noise on a single collecting element were used to determine these values even though the analyte peaks typically spanned 5-8 collectors of the 128-detector element array detector. This approach was selected because when the sum of the signal and the sum of the noise on more than one collector was used, the S/N dropped (since the noise in this situation grows faster than the signal). In all cases, noise was determined as the standard deviation (N=10) of the signal level of an off-mass collector from a 0.1M $HNO_3$ blank solution. An off-mass collector was used because contamination-free detection limits were desired. Noise can alternatively be determined using collector-to-collector variations from a "blank" region of the spectrum as long as fixed-pattern noise between collectors can be removed. TABLE 3 lists the limits of detection (LOD) for the 128-detector element array detector system.

TABLE 3

Detection limits measured for a 128-element (FPC-128) charged-particle detector.

| Isotope | FPC-128 |
| --- | --- |
| $^{48}$Ti | 1.1 |
| $^{51}$V | 4.5 |
| $^{52}$Cr | 4.5 |
| $^{55}$Mn | 2.1 |
| $^{88}$Sr | 0.7 |
| $^{100}$Mo | 0.4 |
| $^{111}$Cd | 0.3 |
| $^{119}$Sn | 0.2 |
| $^{165}$Ho | 0.4 |
| $^{186}$W | 0.5 |
| $^{193}$Ir | 0.5 |
| $^{203}$Tl | 0.7 |
| $^{209}$Bi | 1.1 |

Isotope-Ratio Accuracy and Precision

Isotope-ratio accuracy (IRA) for the test system configured with the 128-element detector was determined with a 5-second total integration time for several isotope pairs. Ratios were calculated from single-collector peak heights for two isotopes. IRA values are listed in TABLE 4.

TABLE 4

Isotope Ratio Accuracy for a 128-element (FPC-128) detector.

| Isotope Ratio | FPC-128 |
|---|---|
| $^{58}$Ni/$^{60}$Ni | 2.7 |
| $^{63}$Cu/$^{65}$Cu | 5.8 |
| $^{66}$Zn/$^{68}$Zn | 2.4 |
| $^{88}$Sr/$^{86}$Sr | 8.2 |
| $^{100}$Mo/$^{97}$Mo | 3.2 |
| $^{114}$Cd/$^{112}$Cd | 0.82 |
| $^{120}$Sn/$^{118}$Sn | 0.4 |
| $^{121}$Sb/$^{123}$Sb | 0.73 |
| $^{184}$W/$^{186}$W | 1.3 |
| $^{193}$Ir/$^{191}$Ir | 0.032 |

Generally, less than 1% error was achieved except for isotopes in the region of the spectrum between $^{40}$Ar$^+$ and $^{80}$Ar$_2$$^+$. Errors in these regions were higher because of elevated noise, attributable to high ion currents associated with $^{40}$Ar$^+$ and $^{80}$Ar$_2$$^+$ in the ICP.

IRA is greatly improved by accounting for a linear bias between low-mass and high-mass sides of the 128-element (FPC-128) array detector, as explained herein. With better spectral definition it is much easier to center two isotopes on two different collecting elements at a given time. Since a peak spans several pixels of a detector array, IRA may be improved by using a fitting function to determine peak height or area, as will be understood by those of skill in the art. No limitations are intended.

Figure 5:
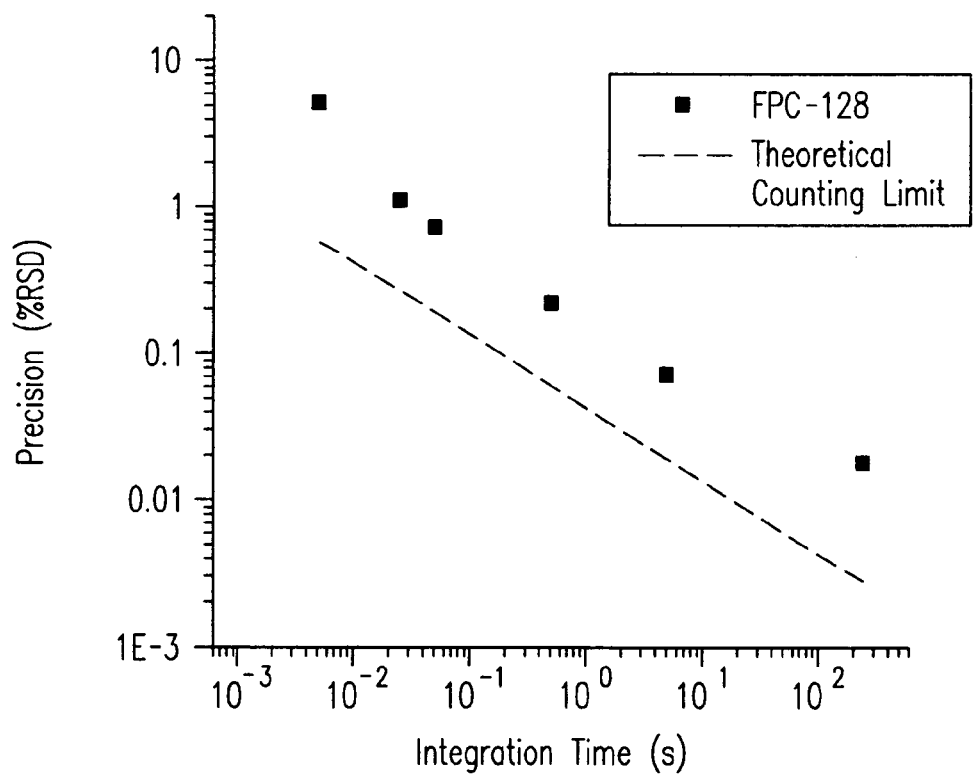
FIG. 5 is a plot of the isotope ratio precision plotted as a function of integration time for isotopes of Ag from a 1 ppm solution measured using a dual gain array detector system, according to an embodiment of the invention.

Isotope ratio precision (IRP) was determined by calculating the % RSD for ten measurements of a 1 ppm silver (Ag) solution at various integration times. Signals from $^{107}$Ag and $^{109}$Ag isotopes were taken as the sum of outputs of all collector elements accumulating ions from the respective isotopes. The sum of the signal from multiple collectors was used to minimize effects of peak drift due to fluctuations in the magnetic field or accelerating potential. FIG. 5 is a plot showing isotope ratio precision plotted as a function of the integration time for Ag isotopes. The dashed line represents the theoretical counting-statistics limit based on number of charges collected using the 128-detector element array detector. Data show that precision improves as the square root of the number of ions collected, a limit governed by counting statistics. A value of 0.018% RSD was reached in less than 300 seconds. This value may be improved by correcting, e.g., for magnetic field instabilities, and/or the accelerating potential, and/or other fluctuations in the dark current.

Resolution

Figure 6:
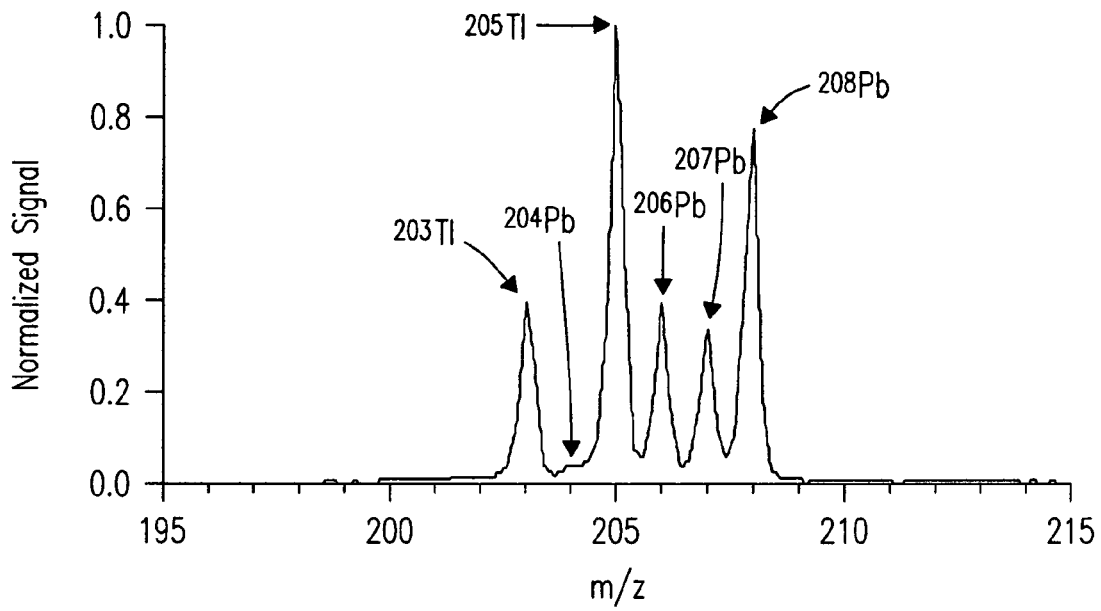
FIG. 6 presents a detector response signal data spectrum collected using a 128-collector element array detector system showing resolution obtained with a 50-µm mass spectrograph entrance slit, according to an embodiment of the invention.

Resolving power for the 128-element array detector in the test configuration (with a dual low and high gaining capability) configured with a 50-μm MHMS entrance slit was determined from the $^{205}$Tl peak. FIG. 6 presents results for Tl and Pb spectra. As observed in the figures, $^{206}$Pb and $^{207}$Pb isotopes are discernable in the spectra. Resolving power can be raised to about 600 by narrowing the entrance slit of the MHMS, e.g., to 50 μm. In this spectrum, signal is reduced by a factor of approximately three. Variations in ion optics optimization can account for the larger than expected signal drop.

Dynamic Range

Figure 7:
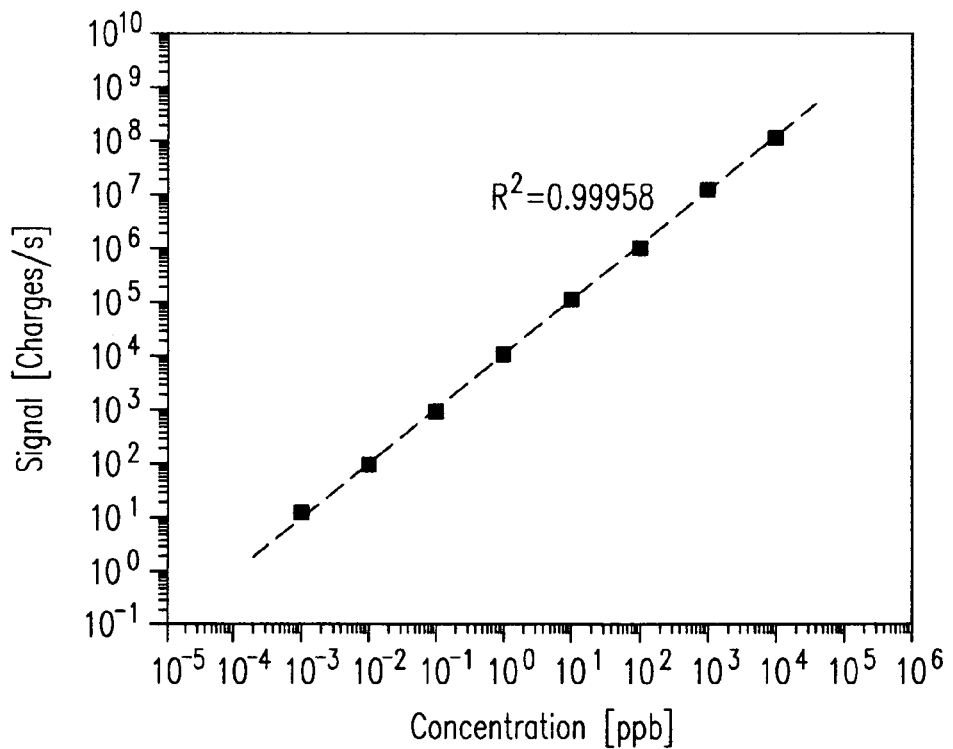
FIG. 7 is a plot showing linear dynamic range associated with a 128-detector element array detector set at high gain, according to an embodiment of the invention.

Linear dynamic range for the test configuration utilizing the 128-element array detector was determined. A high gain setting was used by analyzing Ho solutions at concentrations ranging from about $1 \times 10^{-3}$ ng mL$^{-1}$ to about $50 \times 10^3$ ng mL$^{-1}$. Various integration times were used to accommodate the wide range of ion fluxes. For example, for high intensity particle fluxes, integration times can be short, e.g., from a few microseconds to a few milliseconds. For low intensity particle fluxes, integration times can be, e.g., tens of seconds. No limitations are intended. FIG. 7 is a plot comparing linear dynamic range for the detector system. Dynamic range is shown to be linear over a span of more than seven orders of magnitude. At least another two orders of magnitude should be obtainable on the high side of the concentration range using a low-gain setting, as provided by the variable gaining system described herein.

Independent Gain Levels

Figure 8A:
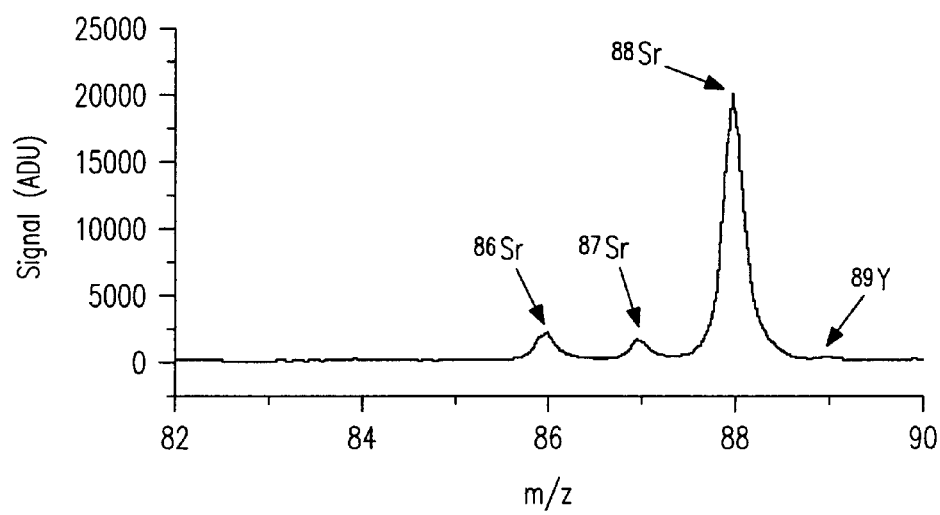
FIG. 8a is a plot showing $^{89}Y^+$ data collected using a 128-detector element array detector with all detector elements set at a fixed low gain value, according to an embodiment of the invention.
Figure 8B:
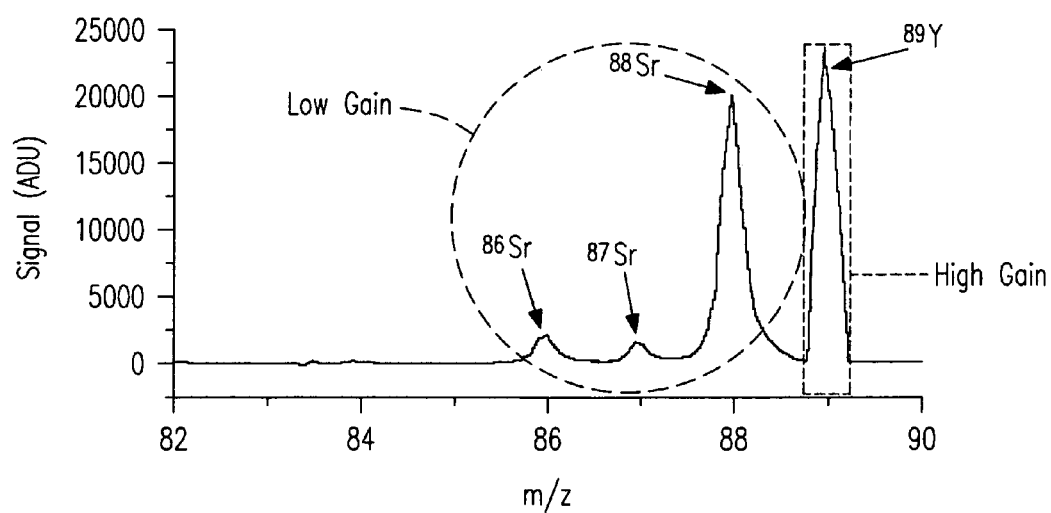
FIG. 8b is a plot showing $^{89}Y^+$ data collected using a 128-detector element array detector with detector elements covering the $^{89}Y^+$ mass range selectively set at high gain with all other detector elements simultaneously set at a fixed low gain value as in FIG. 8a, demonstrating selective gaining capability, according to another embodiment of the invention.

Selective and independent gaining capability of the instrument system of the test configuration equipped with the 128-element array detector was evaluated by introducing into the ICP a solution containing $1 \times 10^3$ ng mL$^{-1}$ Sr and 10 ng mL$^{-1}$ Y and collecting spectra at low and high gain settings, respectively, and/or selected combinations thereof. FIG. 8a is a plot showing $^{89}$Y data collected using 128-detector element array detector with all elements set at low gain, according to an embodiment of the invention. FIG. 8b is a plot showing $^{89}$Y data collected using the 128-element array detector with elements covering the Sr peaks ($^{86}$Sr, $^{87}$Sr, and $^{88}$Sr) all set at a low fixed gain and elements covering the $^{89}$Y peaks set at high gain, according to another embodiment of the invention. Data presented in FIG. 8b show that variable gain adjustment provided by the invention permits analysis of samples containing vastly different analyte concentrations through use of selective gain level choices.

Independent Addressability

Independent addressability has also been demonstrated in the 128-element array detector of the test configuration described herein. "Independent addressability" as the term is used herein means independent command and control of any single detector element (described previously with respect to FIG. 1) or group(s) of detector elements including configuration parameters and unique sequencing of readout operations of the detector elements. Thus group(s) of detector elements can by addressed, controlled, and readout separately and independently of any other single detector element or group(s) of elements. For example, independent addressability provides capabilities including, but not limited to, e.g., setting integration times differently for different detector elements, setting gain levels differently for different detector elements (see FIG. 8b), setting readout mode (e.g., destructive or non-destructive) differently for different detector elements, and setting readout sequences differently (e.g., other than sequential) for different detector elements. In FIG. 8b, one aspect of independent addressability is demonstrated. Detector elements for measuring particle fluxes attributable to $^{86}$Sr$^+$, $^{87}$Sr$^+$, and $^{88}$Sr$^+$ were set to a low fixed gain, whereas those specific to the region of $^{89}$Y$^+$ were set to a high gain in order to detect the low ion flux of $^{89}$Y$^+$ with greater sensitivity. No limitations are intended. All embodiments and uses of the independent addressability capability as will be implemented by those of skill in the art are within the scope of the disclosure.

Closure

Results using a test instrument system configuration coupled to an array detector of the invention show a capability to individually select gain level for each Faraday collector in the 128 element array detector. Limits of detection in the hundreds of pg.L$^{-1}$ for metals in solution have been obtained. Some additional features, such as a broader linear dynamic range (over eight orders of magnitude), greater resolving power (up to 600), and improved isotope ratio accuracy were also attained. In addition, isotope ratio precision of 0.018% RSD has been achieved.

While the present disclosure is exemplified by specific embodiments, it should be understood that the invention is not limited thereto, and variations in form and detail may be made without departing from the spirit and scope of the invention. All such modifications as would be envisioned by those of skill in the art are hereby incorporated.

We claim:

1. An apparatus comprising:
two or more detector elements operatively disposed for detecting and measuring different and/or separated charged particles, said detector elements each comprising a charge-collecting element operatively disposed to an amplifying circuit, wherein said amplifying circuit comprises an integrating amplifier operatively coupled to one or more integrating capacitors and individually selectable switching means providing multiple and independently selectable levels of integration and/or gain for each of said detector elements; and
whereby said detector elements are each independently selectable and addressable providing for simultaneous detection and measurement of said charged particles at one or more levels of particle flux in a measurement cycle.

2. An apparatus of claim 1, wherein said charged particles are selected from the group consisting of ions, electrons, positrons, alpha particles, aerosols, droplets, particulates, or combinations thereof.

3. An apparatus of claim 1, wherein said charged particles are net positive.

4. An apparatus of claim 1, wherein said charged particles are net negative.

5. An apparatus of claim 1, wherein said charge-collecting elements are disposed in an array.

6. An apparatus of claim 5, wherein said array is a linear array.

7. An apparatus of claim 5, wherein said array is a curvilinear array.

8. An apparatus of claim 5, wherein said array is a 2-dimensional array.

9. An apparatus of claim 5, wherein said array is a 3-dimensional array.

10. An apparatus of claim 5, wherein said charge-collecting elements are composed of an electrically conductive material.

11. An apparatus of claim 10, wherein said electrically conductive material is selected from the group consisting of alloy, single, mixed, layered, binary, or combinations thereof.

12. An apparatus of claim 1, wherein said amplifying circuit is a charge-integrating amplifying circuit.

13. An apparatus of claim 12, wherein said charge-integrating amplifying circuit is a capacitive transimpedance amplifying circuit.

14. An apparatus of claim 12, wherein said charge-integrating amplifying circuit comprises two or more selectable charge-integrating capacitors.

15. An apparatus of claim 14, wherein said charge-integrating capacitors are fixed capacitors.

16. An apparatus of claim 14, wherein said charge-integrating capacitors are variable capacitors.

17. An apparatus of claim 1, further comprising a readout means operatively disposed for reading charges accumulated in said two or more detector elements.

18. An apparatus of claim 17, wherein said readout means reads charges accumulated in said two or more detector elements simultaneously, sequentially, non-sequentially, selectively, randomly and/or independently, in parallel, non-destructively, destructively, or combinations thereof.

19. An apparatus of claim 17, wherein the reading of charges by said readout means is non-destructive.

20. An apparatus of claim 17, wherein the reading of charges by said readout means is destructive.

21. An apparatus of claim 1, further comprising a resetting means operatively disposed for discharging charges accumulated in each of said two or more detector elements providing zero net charge therein.

22. An apparatus of claim 1, further comprising a storage means for storing data representative of charges accumulated in each of said two or more detector elements.

23. An apparatus of claim 1, further comprising a switching multiplexer operatively disposed to a computing means for automated selection and operation of said switching multiplexer.

24. An apparatus of claim 23, wherein said switching multiplexer is disposed discretely or as a hybrid with said two or more detector elements.

25. An apparatus of claim 23, wherein said switching multiplexer is disposed monolithically or is fully integrated with said two or more detector elements.

26. An apparatus of claim 1, wherein said switching multiplexer includes members selected from the group consisting of selectable switch, polarity switch, resetting switch, readout switch, charge-integrating capacitor, or combinations thereof.

27. An apparatus of claim 1, wherein said measurement cycle is a single measurement cycle.

28. An apparatus of claim 1, wherein said measurement cycle is a repetitive or repeatable measurement cycle.

29. An apparatus of claim 1, wherein said measurement cycle is a repeatable measurement cycle.

* * * * *